US011126936B2

(12) United States Patent
Job

(10) Patent No.: US 11,126,936 B2
(45) Date of Patent: Sep. 21, 2021

(54) SYSTEM AND METHOD FOR THE AUTOMATED GENERATION OF FINANCIAL AND RESOURCE FORECASTING DATA FOR EVENTS

(71) Applicant: Jaime Job Consulting, Inc., Snohomish, WA (US)

(72) Inventor: Jaime M. Job, Snohomish, WA (US)

(73) Assignee: Jaime Job Consulting, Inc., Snohomish, WA (US)

(*) Notice: Subject to any disclaimer, the term of this patent is extended or adjusted under 35 U.S.C. 154(b) by 80 days.

(21) Appl. No.: 15/699,620

(22) Filed: Sep. 8, 2017

(65) Prior Publication Data

US 2018/0075372 A1    Mar. 15, 2018

Related U.S. Application Data

(60) Provisional application No. 62/385,625, filed on Sep. 9, 2016.

(51) Int. Cl.
| | | |
|---|---|---|
| *G06Q 10/04* | (2012.01) | |
| *G06Q 10/06* | (2012.01) | |
| *G06Q 10/00* | (2012.01) | |

(52) U.S. Cl.
CPC ......... *G06Q 10/04* (2013.01); *G06Q 10/0635* (2013.01); *G06Q 10/0639* (2013.01)

(58) Field of Classification Search
CPC . G06Q 10/04; G06Q 10/0635; G06Q 10/0639
USPC ...................................................... 705/7.11
See application file for complete search history.

(56) References Cited

U.S. PATENT DOCUMENTS

| | | | | |
|---|---|---|---|---|
| 5,289,368 | A * | 2/1994 | Jordan ................... | G06Q 10/06 705/7.13 |
| 8,510,145 | B2* | 8/2013 | Rowland ................ | G06Q 30/06 705/7.13 |
| 2002/0120492 | A1* | 8/2002 | Phillips .................. | G06Q 10/06 705/7.35 |
| 2007/0039024 | A1* | 2/2007 | Krajcev ................. | G06Q 50/12 725/46 |
| 2007/0078697 | A1* | 4/2007 | Nixon .................... | G06Q 30/02 705/7.16 |
| 2010/0205039 | A1* | 8/2010 | Basak .................... | G06Q 10/04 705/7.31 |
| 2012/0005613 | A1* | 1/2012 | O'Sullivan ........ | G06Q 10/1095 715/772 |

(Continued)

OTHER PUBLICATIONS

Kisang Ryu SooCheong, (Shawn) Jang, Alfonso Sanchez, Forecasting Methods and Seasonal Adjustment for a University Foodservice Operation, Journal of Foodservice Business . . . , 2004—Taylor & Francis (Year: 2004).*

(Continued)

*Primary Examiner* — Rutao Wu
*Assistant Examiner* — Abdallah A El-Hage Hassan
(74) *Attorney, Agent, or Firm* — Goodhue, Coleman & Owens, P.C.

(57) ABSTRACT

A system and method for performing forecasting for an event. Information associated with an event is received from a user. Historical data associated with the event is automatically captured. Additional data for the event is captured from a digital resources. A forecast for the event is generated utilizing the information, the historical data, and the additional data.

20 Claims, 14 Drawing Sheets

(56) References Cited

U.S. PATENT DOCUMENTS

2016/0335576 A1\* 11/2016 Peng ................ G06Q 10/06315

OTHER PUBLICATIONS

Katarina Grolinger, Western University, kgroling@uwo.ca, Andrea Zagar, Miriam AM Capretz Western University, Luke Seewald, Energy Cost Forecasting for Event Venues, Western University,Scholarship@Western. Electrical and Computer Engineering Publications Electrical and Computer Engineering Department (Year: 2015).\*

Wan-I Lee1, Cheng-Wu Chen2,3, Kung-Hsing Chen4, Tsung-Hao Chen5, and Chia-Chi Liu6—A Comparative Study On the Forecast of Fresh Food Sales Using Logistic Regression, Moving Average and BPNN Methods, Journal of Marine Science and Technology, vol. 20, No. 2, pp. 142-152 (Year: 2012).\*

\* cited by examiner

*FIG. 7*

90 Day Forecast

*FIG. 8*

Covers, Average Check and Rev by Month

*FIG. 9*

Monthly Forecast by Meal Period

*FIG. 10*

Daily Forecast by Meal Period 1000

| | Group | | Thursday 1/1/2015 | Friday 1/2/2015 | Saturday 1/3/2015 | Sunday 1/4/2015 | Monday 1/5/2015 | Tuesday 1/6/2015 |
|---|---|---|---|---|---|---|---|---|
| B r e a k f a s t | Definites OTB | Covers | 0 | 0 | 0 | 0 | 0 | 180 |
| | | Ave Check | $ - | $ - | $ - | $ - | $ - | $ 32.00 |
| | | Revenue | $ - | $ - | $ - | $ - | $ - | $ 5,760 |
| | Forecasted Tentatives | Covers | 0 | 0 | 0 | 0 | 0 | 0 |
| | | Ave Check | $ - | $ - | $ - | $ - | $ - | $ - |
| | | Revenue | $ - | $ - | $ - | $ - | $ - | $ - |
| | Reach | Covers | 5 | | | | | |
| | | Ave Check | $ 11.00 | $ - | $ - | $ - | $ - | $ - |
| | | Revenue | $ 55 | $ - | $ - | $ - | $ - | $ - |
| | Total Breakfast Forecast | Covers | 5 | 0 | 0 | 0 | 0 | 180 |
| | | Ave Check | $ 11.00 | $ - | $ - | $ - | $ - | $ 32.00 |
| | | Revenue | $ 55 | $ - | $ - | $ - | $ - | $ 5,760 |
| L u n c h | Definites OTB | Covers | 0 | 0 | 0 | 0 | 0 | 180 |
| | | Ave Check | $ - | $ - | $ - | $ - | $ - | $ 47.00 |
| | | Revenue | $ - | $ - | $ - | $ - | $ - | $ 8,460 |
| | Forecasted Tentatives | Covers | 0 | 0 | 0 | 0 | 0 | 0 |
| | | Ave Check | $ - | $ - | $ - | $ - | $ - | $ - |
| | | Revenue | $ - | $ - | $ - | $ - | $ - | $ - |
| | Reach | Covers | | | | | | |
| | | Ave Check | $ - | $ - | $ - | $ - | $ - | $ - |
| | | Revenue | $ - | $ - | $ - | $ - | $ - | $ - |
| | Total Lunch Forecast | Covers | 0 | 0 | 0 | 0 | 0 | 180 |
| | | Ave Check | $ - | $ - | $ - | $ - | $ - | $ 47.00 |
| | | Revenue | $ - | $ - | $ - | $ - | $ - | $ 8,460 |

*FIG. 11*

Compare Revenue to Previous Forecasts

1100

FIG. 12
Revenue Analysis by Meeting Class / Booking Type

*1200*

FIG. 13
Booking Pace

Leadtime Analysis  1400

SYSTEM AND METHOD FOR THE AUTOMATED GENERATION OF FINANCIAL AND RESOURCE FORECASTING DATA FOR EVENTS

BACKGROUND

Within all sales driven operations, forecasting has become one of the most critical and company driven statistics. Successful companies, organizations, and individuals typically utilize at least one forecasting component for accounting, scheduling, product, delivery, and operations of their group, sometimes with limited success. Sometimes overly complicated systems, inaccurate data, improper understanding of historical, present, and future conditions and improper training may complicate effective forecasting. Most organizations make efforts at forecasting to be more efficient and profitable despite the challenges faced.

SUMMARY

One embodiment provides a system and method for performing forecasting for an event. Information associated with an event is received from a user. Historical data associated with the event is automatically captured. Additional data for the event is captured from a plurality of digital resources. A forecast for the event is generated utilizing the information, the historical data, and the additional data. Another embodiment provides a server including a processor configured to execute a set of instructions and a memory for storing the set of instructions. The set of instructions are executed to perform the methods described herein.

Another embodiment provides a system for managing events. The system includes a server configured to interface with a website or applications installed on a number of electronic devices. The server is configured to receive information associated with an event from a user, automatically capture historical data associated with the event, and capture data associated with the event from a number of digital resources, and generate a forecast for the event from an authorized user. The system further includes at least one database in communication with the server, the database is configured to store the information, historical data, and the data associated with the event for access by the server.

Yet another embodiment provides an apparatus and server for performing forecasting for events. The server may include a processor for executing a set of instructions and a memory for storing the set of instructions. The set of instructions are executed to receive information associated with an event from a user, automatically capture historical data associated with the event, capture additional data for the event from a plurality of digital resources, and generate a forecast for the event utilizing the information, the historical data, and the additional data.

BRIEF DESCRIPTION OF THE DRAWINGS

Illustrative embodiments of the present invention are described in detail below with reference to the attached drawing figures, which are incorporated by reference herein and wherein:

Figure 7:
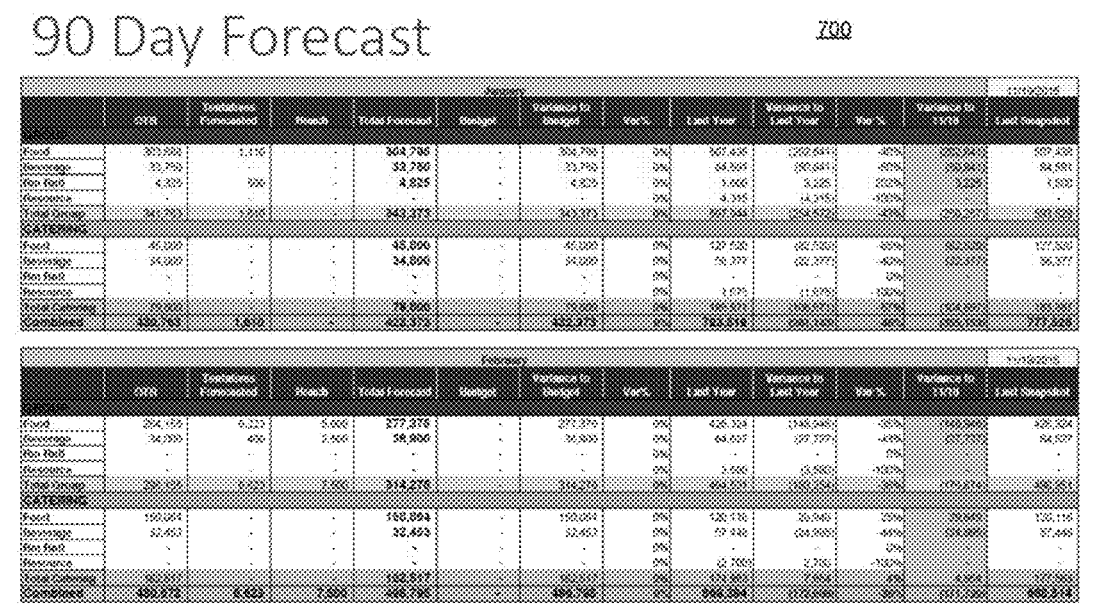

FIG. 7 is a pictorial representation of a 90 day forecast report of the forecasting system in accordance with an illustrative embodiment;

Figure 8:
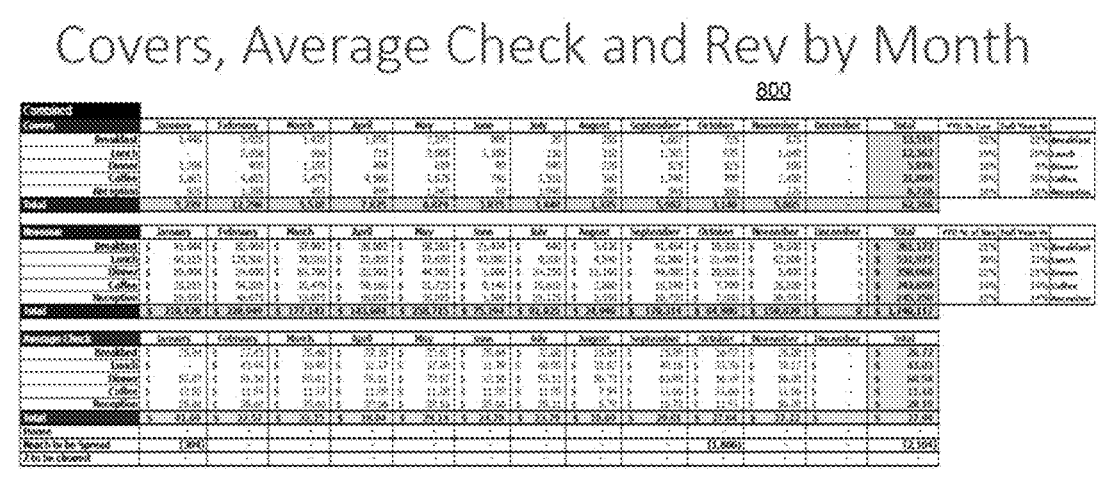

FIG. 8 is a pictorial representation of a covers, revenue, and average check report of the forecasting system in accordance with an illustrative embodiment;

Figure 9:
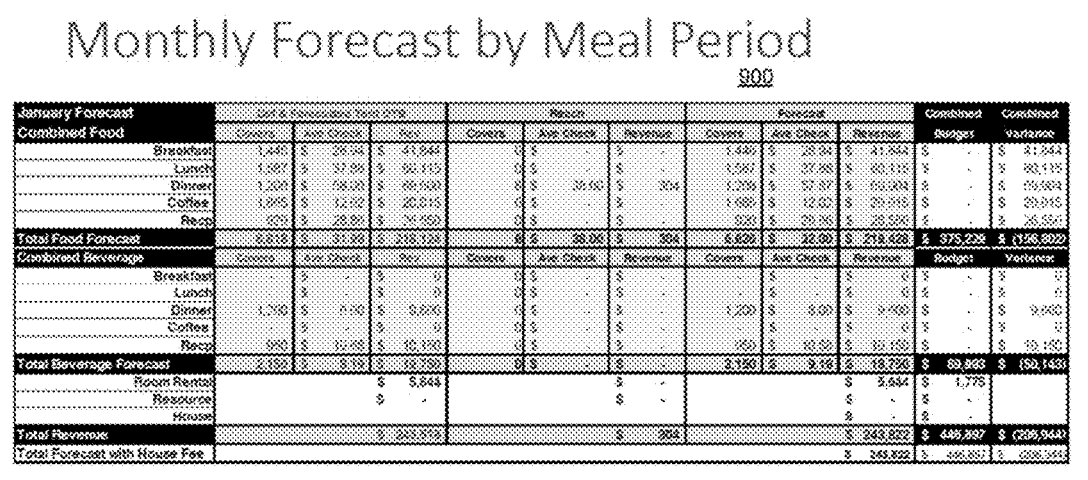

FIG. 9 is a pictorial representation of a monthly forecast by meal period report of the forecasting system in accordance with an illustrative embodiment;

FIG. 10 is a pictorial representation of a daily forecast by meal period report of the forecasting system in accordance with an illustrative embodiment;

Figure 11:
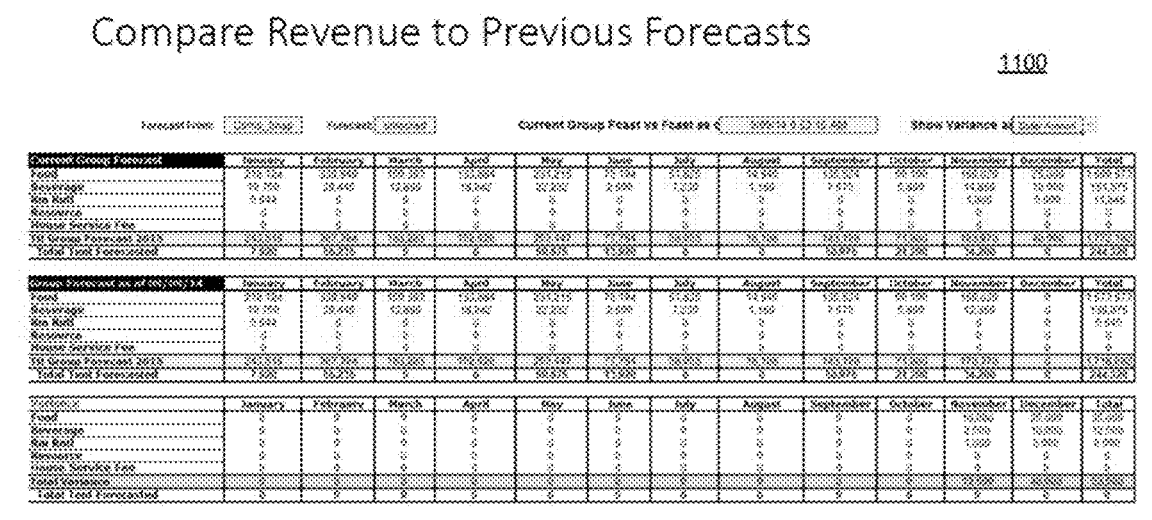

FIG. 11 is a pictorial representation of a revenue v. forecast comparison report of the forecasting system in accordance with an illustrative embodiment;

FIG. 12 is a pictorial representation of a revenue analysis report of the forecasting system in accordance with an illustrative embodiment;

FIG. 13 is a pictorial representation of a booking pace report of the forecasting system in accordance with an illustrative embodiment;

Figure 14:
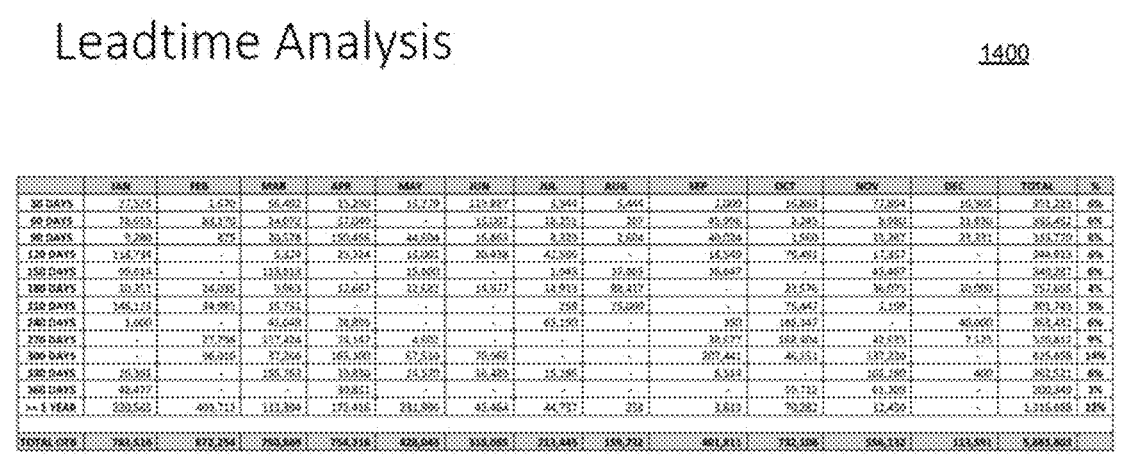

FIG. 14 is a pictorial representation of a lead time analysis report of the forecasting system in accordance with an illustrative embodiment.

DETAILED DESCRIPTION OF THE DRAWINGS

Figure 1:
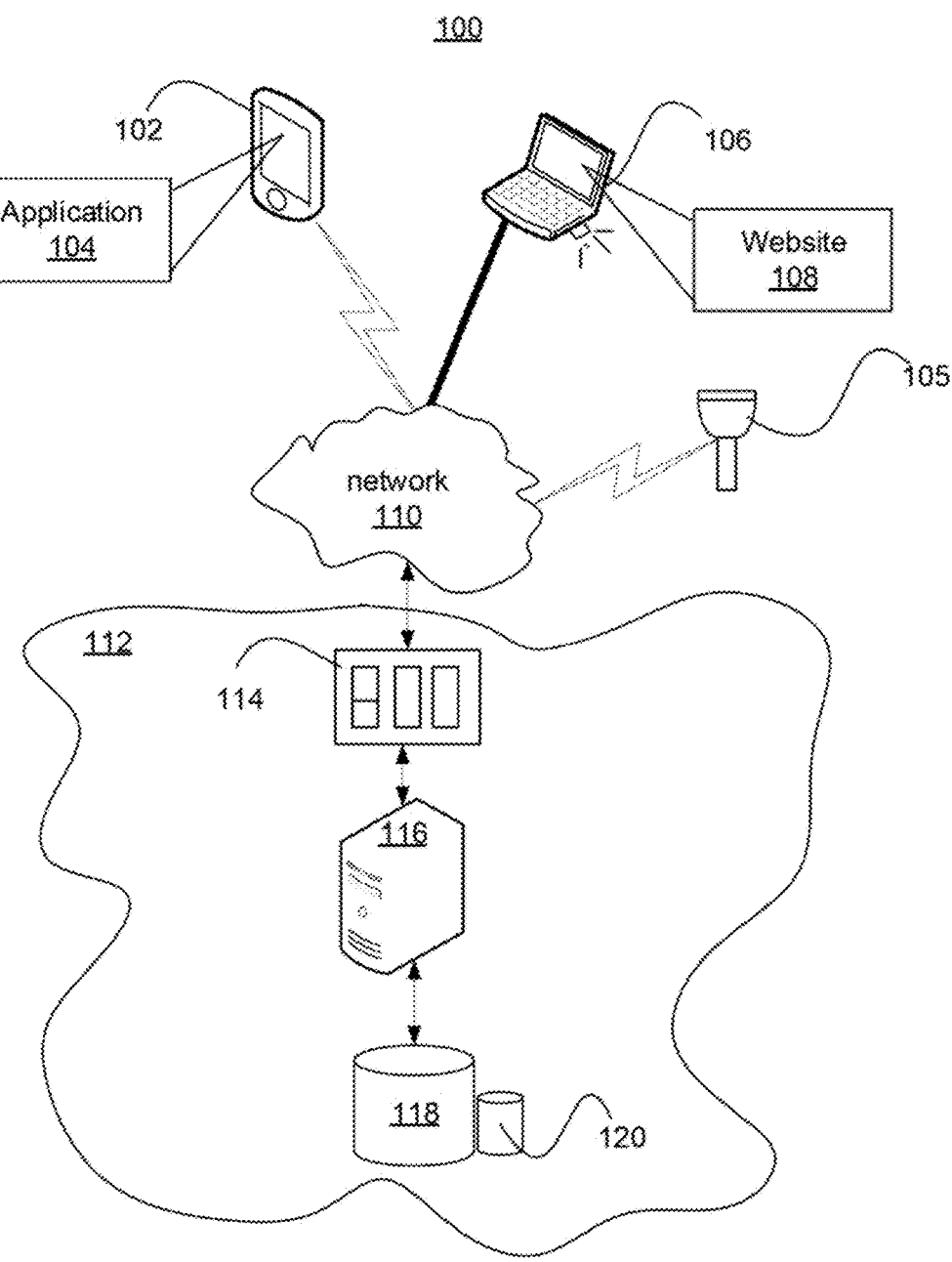
FIG. 1 is a pictorial representation of a communications system for managing event forecasting in accordance with an illustrative embodiment.

The illustrative embodiments provide a system, method, apparatus, and computer program product for the automatic generation of financial and resource forecasting data from digital sources. In one embodiment, the illustrative embodiments may be utilized to forecast and manage events. The events may be managed for any number of facilities, buildings, businesses, campuses, outdoor venues, or gathering places (hereinafter referred to as a "facility"). The events may represent a time period of service at a location (e.g., holiday weekend at a hotel, work day for a restaurant, etc.), concerts, festivals, conferences, get-togethers, trainings, classes, organized activities, sporting venues, collaborations, expositions, gatherings, meetings, happenings or so forth (hereinafter referred to as an "event"). For example, a facility may be a hotel/convention center, and an event may be a technical conference at the hotel/convention center with thousands of participants. Various examples, are given with regards to hotels for purposes of simplicity, but the described embodiments are equally applicable to any number of events and service providers.

The illustrative embodiments utilize statistical analysis to significantly enhance the systems and methods utilized for financial and resource forecasting. By leveraging technology and networks to accelerate data capture capabilities, the illustrative embodiments significantly improve accuracy of resource and revenue forecasting. The illustrative embodiments allow data to be captured from any number of devices, such as mobile phones, tablets, laptops, inventory management systems, optical reading interfaces, tracking systems, databases, and so forth, to be utilized.

In one embodiment, the system utilizes a cloud-based management system for managing forecasting for events and locations. The system may be web-based allowing authorized users to generate and access events and other information at their convenience. The information associated with each event may be stored in a centralized system (e.g., server and database) that allows multiple users to track events from forecasting and the associated pre-planning to a wrap-up meeting upon completion and additional planning and management. The system may also be utilized to send out reporting alerts including relevant information to designated users to ensure that information is efficiently communicated and issues are resolved. Alerts, messages, or notifications may also be communicated to the users in response to the status, conditions, or parameters tracked by the system.

The system may allow commonly available communications devices or platforms, such as smart phones, cell phones, iPods, gaming devices, wearable electronics, inventory management systems, optical reading computers, handheld scanners, and tablet computers, to be utilized instead of customized hardware or devices. For example, the communications device may only require an application and network connection or signal (e.g., cellular, Wi-Fi, Bluetooth, etc.) to provide information, track, manage, and report on events and otherwise perform the illustrative embodiments. In most cases, individuals already have access to a personal communications or communications device that may be utilized to implement the described embodiments without added expenses or complexity. For example, an individual or party utilizing a smart phone may utilize an application in a mobile and flexible environment.

The forecasting system, method, and devices herein described, may be utilized with wired and/or wireless signals, connections, and systems to manage human resources, manufacturing, product shipments, product reservations, and many other company assets that are scheduled and managed based on projected sales forecasts.

FIG. 1 is a pictorial representation of a communications system 100 for managing and forecasting events in accordance with an illustrative embodiment. The communications system 100 may include any number of hardware and software components, including, but not limited to, devices, equipment, systems, modules, operating systems, kernels, components, and applications. In one embodiment, the communications system 100 may include a wireless device 102, an application 104, a scanner 105, a laptop 106, a website 108, a network 110, and a cloud system 112.

The cloud system 112, or network may similarly include any number of components. In one embodiment, the cloud system 112 may include a management system 114, web server 116, a storage 118, and a database 120. Each of the devices, systems, and equipment of the communications system 100 may include any number of computing and telecommunications components, devices or elements which may include processors, memories, caches, busses, motherboards, chips, traces, wires, pins, circuits, ports, interfaces, cards, converters, adapters, connections, transceivers, displays, antennas, and other similar components that are not described herein for purposes of simplicity.

The wireless device 102 and the laptop 106 are examples of communications and computing devices that may be utilized to receive user input regarding events and issues and may similarly communicate information in real-time as updated. Other communications and computing devices may similarly be utilized, such as voice over Internet Protocol telephones, soft phones, chatting applications, faxes, tablet computers, desktop computers, terminals, or so forth. The wireless device 102, scanner 105, and laptop 106, and/or any number of other devices may utilize the application 104, the website 108, an application-specific integrated circuit (ASIC), digital logic, an add-on, an operating system, or other hardware or software and to perform the illustrative embodiments and communications as are herein described. For example, a graphical user interface may be displayed to the user visually or audibly by any of the devices of the communications system 100 for receiving user input and selections and providing information and details to the respective users.

The software embodied by the application 104 and the website 108 allows users to update, create, store, communicate, and view information and reports of any of the different communications tools of the event management software. The communications system 100 facilitates communications between parties that are closely positioned, remotely located, or on the move.

In one embodiment, the network 110 represents an Internet or data connection available to multiple parties. The network 110 may enable communications through the application 104, the website 108, mobile phones, landline telephones, radios, and other mobile communications devices to a centralized system, such as the cloud system 112. The different components of the communications system 100 may be configured to communicate using wireless communications, such as satellite connections, Wi-Fi, WiMAX, 3G, 4G, 5G, personal communications systems, DMA wireless networks, and/or hardwired connections, such as fiber optics, T1, cable, DSL, high speed trunks, powerline communications, and telephone lines. Any number of communications architectures including client-server, network rings, peer-to-peer, n-tier, application server, or other distributed or network system architectures may be utilized.

The wireless devices 102 may communicate with a wireless network (that is considered to be part of the network 110) using communications protocols, such as time division multiple access (TDMA), code division multiple access (CDMA), global systems for mobile (GSM) communications, personal communications systems (PCS), Wi-Fi, WLAN, WiMAX, or other frequently used cellular and data communications protocols and standards. The wireless devices 102 may include smart phones (e.g. iPhones, Android devices, etc), cellular phones, Blackberry® devices, Windows devices, personal digital assistances (PDA), mp3 players, laptops, evolution data optimized (EDO) cards, multi-mode devices, and other wireless communication devices and elements. In one embodiment, the described systems and methods may take advantage of a Wi-Fi network that is already provided for employees and guests of a facility.

Communications within the communications system 100 may also occur on any number of networks which may include wireless networks, data or packet networks, cable networks, satellite networks, private networks, publicly switched telephone networks (PSTN), the network HO, or other types of communication networks. The network 112 is infrastructure for sending and receiving messages and signals according to one or more designated formats, standards, and protocols. The network 110 of the communications system 100 may represent a single communication service provider or multiple communications services providers. For example, the network 110 may include any number of public, private, and virtual networks. The features, services, and processes of the illustrative embodiments may be implemented by one or more components of the communications system 100 independently or as a networked implementation.

The cloud system 112 represents a cloud computing environment and network utilized to deliver software as a service (SaaS). The cloud system 112 allows one or more service providers to centralize data, software, and computation for access through the application 104 and the website 108 which communicate with the cloud system 112 through the network 110 through a wired or wireless connection. The cloud system 112 may prevent unauthorized access to data stored in storage 118 as well as any number of associated databases, modules, applications, or so forth that may be saved in the storage 118. In addition, service providers may more quickly roll out the event management system, software, and embodiments herein described with easier manageability and less maintenance. In addition, the cloud system 112 allows the overall communications system 100 to be scalable for quickly adding and removing service providers as needed. Communications with the cloud system 112 may utilize encryption, secure tunnels, handshakes, secure identifiers, firewalls, specialized software modules, or other data security systems and methodologies as are known in the art.

Although not shown, the cloud system 112 may include any number of load balancers. The load balancer is one or more devices configured to distribute the workload of the event management process and software across the cloud system 112 to optimize resource utilization, throughput, and minimize response time and overload. For example, the load balancer may represent a multilayer switch, database load balancer, or a domain name system server. The load balancer may facilitate communications and functionality (e.g. database queries, read requests, write requests, etc) between the wireless device 102 or the laptop 106 and the cloud system 112.

In one embodiment, the web server 116 may be utilized to provide the website 108 for interfacing with users. Information received through the website 108 may be managed by the storage 118 and any associated database 120. The web server 116 may communicate with the database 120 to respond to read and write requests. The database 120 may utilize any number of database architectures and database management systems (DBMS) as are known in the art.

In one embodiment, the communications system 100 or the cloud system 112 may also include the communications management system 114 which is one or more devices utilized to enable, initiate, route, and manage communications between one or more telephonic and computing devices. The communications management system 1144 may include one or more devices networked to manage the network 110 and cloud system 112. For example, the communications management system 128 may include any number of servers, routers, switches, or advanced intelligent network devices.

The network 110 sends and receives the electronic signals through any number of transmission mediums. The network 110 may include various fiber optics, cables, transmission towers, antennas, or other elements for transmitting voice communications to the connected telephonic devices. In one embodiment, the communications management system 114 may manage the event management software and services provided to the wireless device 102 and laptop 106. For example, the communications management system 114 may include a host application or logic that communicates with the application 104. The communications management system 114 may also manage the website 108 and corresponding communications and data management.

Figure 2:
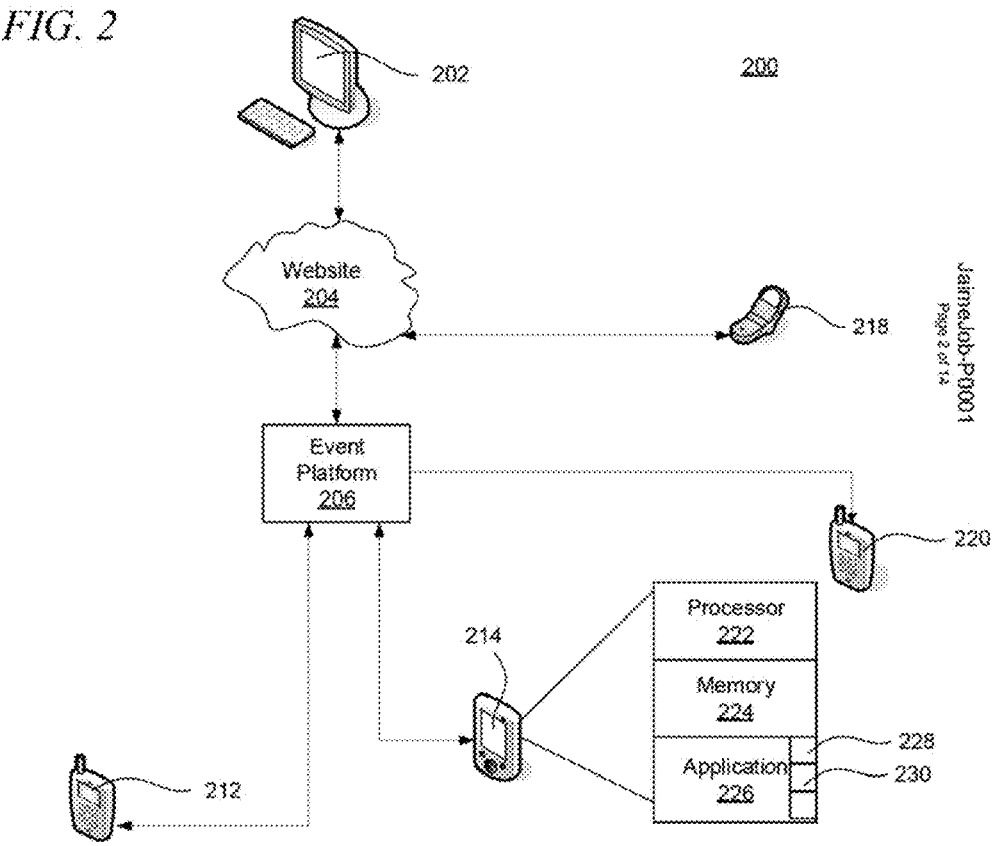
FIG. 2 is a pictorial representation of an event management system in accordance with an illustrative embodiment.

FIG. 2 is a pictorial representation of an event management system 200 in accordance with an illustrative embodiment. The event management system 200 may include any of the components previously described for the communications system 100 of FIG. 1. In one embodiment, the event management system 200 may include a computer 202, a website 204, an event platform 206, wireless devices 212 and 214, and wireless devices 218 and 220. In addition, any of the computer 202, and wireless devices 212, 214, 218, and 220 may include a processor 222, a memory 224, and an application 226 as are shown for the wireless device 214.

The event management system 200 may be utilized to enter information and data, create events, note issues, and manage numerous events simultaneously until resolved. The computer 202 represents a computing or communications device utilized by a user. For example, the computer 202 may be utilized by a front desk clerk or administrative staff of the service provider (e.g. hotel). The user may utilize a web browser or other application on the computer 2022 access the website 204. The website 204 may be a portal or interface that functions as a central point of access to the event platfo6 through a network (e.g., the Internet, an intranet, etc.). The website 204 may be accessed from any computing or communications system or device enabled to communicate directly with the event platform 206 or through a network connection.

For purposes of FIG. 2, the event platform 206 represents the back-end systems, hardware, logic, cloud network, servers, databases, and/or other systems, equipment, and devices that may be utilized to create, manage, track and report on events as herein described.

The website 204 may communicate with the event platform 206 to generate application alerts that are communicated to and displayable to the wireless devices 212 and 214. In one embodiment, the event platform 206 may be a software module or application configured to send application alerts to the users of the wireless devices, 212, 214, 218, 220. For example, the event platform 206 may be a program platform compatible with Apple, Google (e.g. Android), AT&T, Verizon, Sprint, T-Mobile, MetroPCS, and other service providers, companies, and providers. In one embodiment, the user of the wireless devices 212 and 214 that communicate with the event platform 206 may be registered or assigned an identification by the event platform 206 in order to properly route alerts that are created based on new or existing events.

In one embodiment, the event platform 206 may include distinct componentry and modules for communicating with distinct platforms, operating systems, or devices, such as Android, iOS, and Windows. The event platform 206 may representative a multitude of platforms that may be utilized for communicating public or proprietary alert systems and receiving updates from the associated wireless devices 212 and 214, and users.

The processor 222 is circuitry or logic enabled to control execution of a set of instructions. The processor 222 may be or include microprocessors, digital signal processors, application-specific integrated circuits (ASIC), central processing units, or other devices suitable for controlling an electronic device including one or more hardware and software elements, executing software, instructions, programs, and applications, converting and processing signals and information, and performing other related tasks. The processor 222 may be a single chip or integrated with other computing or communications elements.

The memory 224 is a hardware element, device, or recording media configured to store data for subsequent retrieval or access at a later time. The memory 224 may be static or dynamic memory. The memory 224 may include a hard disk, random access memory, cache, removable media drive, mass storage, or configuration suitable as storage for data, instructions, and information. In one embodiment, the memory 224 and processor 222 may be integrated. The memory may use any type of volatile or non-volatile storage techniques and mediums.

The wireless devices 212, 214, 218, 220 may utilize hard keys or soft keys for receiving user input. Hard keys are dedicated buttons or interface elements hard-coded for a single, unique, and consistent purpose. Examples of hard keys include the 12-buttons of the traditional alpha-numeric keypad, the send/end keys commonly found on mobile phones, and buttons to initiate or end a speakerphone function. Soft keys are programmable buttons or interface elements. Soft keys are usually located alongside a display device and may perform different functions dependent on the text shown near the soft keys on the display. For example, soft keys may also be touch screen indicators, buttons, icons, or so forth. Examples of soft keys may include directories and speed dial lists.

In one embodiment, the application 226 is specialized hardware and logic for implementing the illustrative embodiments. In another embodiment, the application 226 may represent software, firmware, sets of instructions, programs, scripts, modules, and so forth that may be executed by the processor 222. The application 226 is a specialized program or app configured to communicate with the website 204 and/or event platform 206 as further shown in FIG. 1. The application 226 may include an interface module 228 for interfacing with the user. In one embodiment, the interface module 228 may include a graphical user interface for displaying data, including events and the associated forecasting information. The interface module 228 may also be utilized to receive information, imported data, or other applicable data. In one embodiment, the user may open the application 226 on the wireless device 214 to create forecasting for a new event. The new event may specify the date, time, expected attendance, historical attendance (if known), seasonal details, other scheduled events, and so forth.

The application 226 may include a message module 230. The message module 230 may be utilized to send any number of messages to designated parties or devices. In one embodiment, the wireless device 212 may be utilized by a manager of the facility. In response to the user utilizing the wireless device 214 submitting a new event through the interface module 228 of the application 226, an alert may be routed from the messaging module 230 through the event management system 200 to the wireless device 212 to keep the manager informed of forecasted results as the updated information is added or modified. In addition, based on viewing the alert including the forecast results, the manager may further input details regarding how the event is to be planned. For example, the manager may utilize an application to indicate that both event planning, kitchen staff, wait staff, maintenance, and grounds keeping teams may be working on the event together to ensure proper forecasting is performed for man hours/workers, food, venues/event assets, equipment, services, technical assets, and other applicable factors, conditions, variables, services, and products.

The messaging module 230 of the event platform 206 is also utilized to manage text, voice, email, chat, and other messages that need to be sent based on instructions or commands from the website 204, users, or other portions of the event management system 200. The event platform 206 may also utilize cellular modems, extenders, repeaters, routers, hot spots, phones linked to the computer network, soft phones, or other devices or modules for providing the messaging or calling functionality. In addition, network links may be utilized to send and receive messages and phone calls from web applications. In one embodiment, the event information may include interactive links for dialing or sending a message to a department (individual or group call), manager, or the guest. For example, event calls may be placed utilizing interactive voice response system to read the information associated with an event to the user and receive user input through selections or voice commands.

In one embodiment, the messaging module 230 of the application may be utilized to send alerts or messages to the wireless devices 218 and 220, that may be incapable or not currently running the application 226. For example, the wireless device 218 may not be a smart device configured to execute the application 226. However, the wireless device 218 may still be configured to receive text messages for creating, managing, and reporting events. In another embodiment, the event platform 206 may be configured to send a message to the wireless device 214 in response to the application 226 experiencing errors or other problems preventing the wireless device 214 from receiving alerts through the application 226. The application 226 may be executed as shown or in slightly different forms as part of the event platform, website 204, or personal computer 202.

In another embodiment, the event management system 200 may be configured to be integrated with or communicate with other systems, software, or equipment, such as a hotel property management system, ordering systems, scheduling systems, calendars, and/or other interfaces. The other system(s) may be utilized to access information regarding guest names, room occupation status, and other information.

Figure 3:
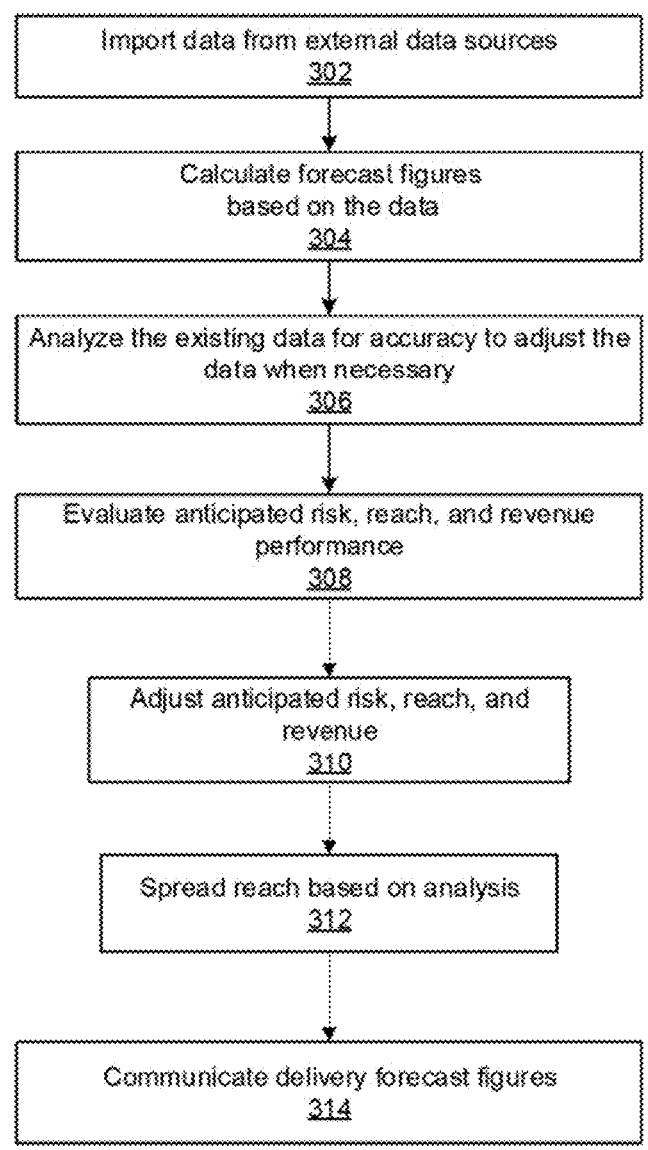
FIG. 3 is a flowchart of a process for managing event forecasting in accordance with an illustrative embodiment.

FIG. 3 is a flowchart of a process for forecasting events in accordance with an illustrative embodiment. The process of FIGS. 3 and 4 may be implemented by an event management system or other communication system. In one embodiment, the system may utilize a number of computing and communications devices, specialized hardware, or other specially programmed devices. In one example, communications may occur through a website, applications, and the necessary back-end devices, including networks, servers, databases, specialized applications, and other logic, hardware, and software components. The system may include or utilize an application or graphical user interface including distinct pages, tabs, or interface components for automatically performing the process of FIG. 3 and interacting with the user or requesting specific input.

The process of FIG. 3 may begin with the system importing data from external data sources (step 302). The system may automatically import data from any number of outside sources (e.g., Delphi, Google, Sales Force, ZOHO, WELCOM, Intra Networks, OpenTable, Yelp, Reso, city calendars, etc.). The system may access any number of public and privately available resources, including databases, servers, services, and so forth that may be utilized to retrieve applicable information. For example, sales management platforms, property management software, corporate management systems, and other applicable platforms, systems, devices, equipment, servers, or resources may be accessed. The system may require that authentication information (e.g., usernames, passwords, pins, addresses, dongles, etc.) be provided in advance to gain access. In one embodiment, the system may utilize a smart assistant (e.g., Siri, Alexa, Echo, Watson, etc.) to receive data and input, process the data, and communicate forecasting information. In one embodiment, step 302 may be performed for a new event received through a website and saved by a database. For example, the new event may be saved as an entry in a MySQL database table utilizing a write request, or other command.

Next the system calculates forecast figures have changed based on the data (step 304). In one embodiment, the process of FIG. 3 may be performed recursively or repetitively based on changing data. Thus, changes in the forecast figures may be viewed and compared. In one embodiment, a "compare" tab, icon, menu item, or other component may be selected to view the forecasting figures including changes in the forecasting figures along with associated data, text, and visuals/graphics.

Next, the system analyzes the existing data for accuracy to adjust the data where necessary (step 306). During step 306, the system will clear data that appears to be inappropriate as automatically determined or based on a review process. For example, the system may display a number of tabs or selectors that may be utilized to review applicable information as detailed below in various examples. The system may also re-import data to get updated information, data, or values. For example, revenue associated with non-food meal periods during the event (e.g. food at a meeting as compared to on a break) may be adjusted for modifications to forecasting and profitability. During step 306, the system may also display "bookings by the manager" to show agenda and revenue information on the books by the manager, booking, month and so forth to confirm the event is blocked and scheduled accurately.

Next, the system evaluates anticipated risk, reach, and revenue performance (step 308). During step 308, the system analyzes revenue previously recorded for prior time periods (e.g., years, moths, seasons, etc.). The system may generate and annual forecast as well as pace and lead time data that may be accessible in different windows, tabs, or portions of the system. For example, the user may be able to see how revenue is pacing and whether it is ahead or behind for the year, month, or another time period. The system may also provide a pickup interface, tab, or window for helping the user review historical data to find business opportunities for solicitation. In one embodiment, the system may automatically generate letters inviting participants in an event back, thanking them for their previous business, suggesting a discount if they return again in the future, or otherwise marketing the services of the user/system.

Next, the system adjusts anticipated risk, reach, and revenue (step 310). The risk, reach, and revenue and adjusted based on the previous analysis and updated information provided by the user or accessed from any number of other sources.

Next, the system spreads the reach based on the analysis (step 312). The reach may be spread by meal period, by day (e.g., covers, average check, revenue, etc.).

Next, the system communicates the delivery forecast figures (step 314). In one embodiment, the forecast figures may be delivered through a specific alert or page displayed to the user. In another embodiment, the system may automatically deliver a discrete report The delivery forecast may be exported to any number of formats or linked to outside labor and scheduling modules. In another embodiment, the forecasting figures and associated report may be received through an electronic message, such as a text message, voice mail system, e-mail, chat, message, application message, or other form of messaging.

In one embodiment, prior to performing the process of FIG. 3, the system signs an authorized user into the system in response to the user submitting user identifiers. In one embodiment, the system is a website, mobile app, or program accessed by a user through a computing or communications device, such as a desktop computer, laptop, or tablet. The authorized user may have previously been assigned a username, password, nickname, account number, or other identifying information. The authorized users may include administrators, employees, and contractors employed by the service provider.

In one embodiment, in response to submitting a username and password, the authorized user, such as the front desk clerk, may be signed into the website and information designated for a particular facility, such as a hotel or restaurant. The user identifiers may also identify a particular facility or event. For authorized users that are associated with numerous facilities or events, the system may request that the user selects a facility or event identifier. For example, a facility identifier may identify a particular name and location of the facility utilizing a drop-down menu presented by the website.

In one embodiment, the system may also send a communication (e.g., alert) to notify users of creation of a new event or changes to the event. In one embodiment, the devices may include wireless devices of authorized users in or throughout the facility or event. In another embodiment, logic, may specify individuals and devices that receive communications, such as management or supervisors and teams or organizations working within a facility. For example, for communications that include ordering or scheduling issues may be sent to a manager assigned those tasks. The communication may be sent as an application specific alert, as a text message, or as an automated call. In one embodiment, the system may internally send a message or command to a program, interface, module or transceiver to send the alert.

The system may also prompt the user to provide additional information at any time to correct deficiencies or to update the applicable information for performing proper forecasting. In one embodiment, a receiving device may be configured to play or display an audio, visual, or tactile indicator (vibration) to the user as a communication message or to prompt additional user input. The communications may be routed to the device in response to the user being signed in to an application or website tracked by the system. In another embodiment, the alert may be routed utilizing a hardware or software identifier, such as an IP address, IMEI, username, phone number, or other identifier known in the art.

The illustrative embodiments may utilize crowdsourced and social media data to understand patrons, events, and activities. In addition, the data sources utilized by the system may be linked to the system for automatic retrieval of registration information, weather, news events, and so forth. For example, public or private websites, servers, subscription services, databases, or other information may be utilized. Historical information and data may also be made available to perform enhanced and granular analysis. The illustrative embodiments may also provide assessments of function resource utilization (e.g., utilization or occupation by week, month, year, season, etc.).

In one embodiment, the information, data, and values originally provided by the user may be referred to as information. The information retrieved from previous or existing events may also be restored to as historical data. The data captured from other sources (e.g., digital sources, services, etc.) may be generally referred to as data or additional data.

The system of FIG. 3 may represent any number of systems including a catering management platform, sales management platform, and so forth. The data may be captured utilizing an application, web browser, USB connected device, wireless headset, keyboard, voice commands, or other processes, methods, or devices.

Figure 4:
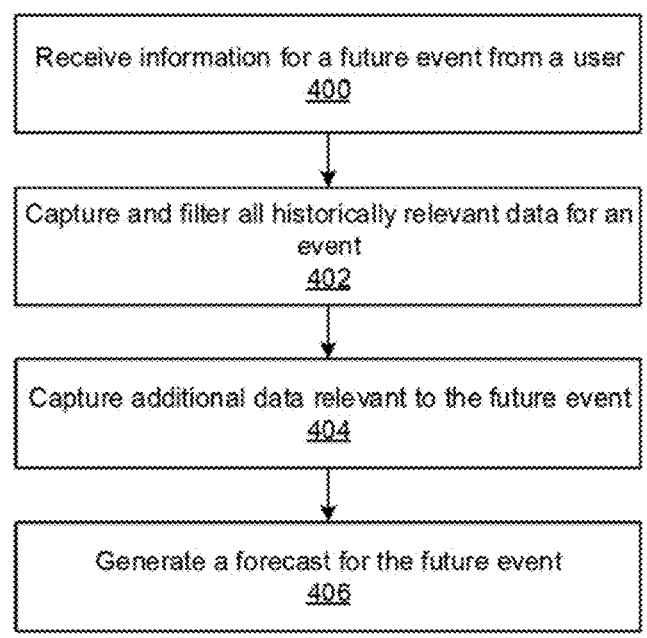
FIG. 4 is a flowchart for capturing data in accordance with an illustrative embodiment.

FIG. 4 is a flowchart for capturing data in accordance with an illustrative embodiment. The process of FIG. 4 may be performed as part of the process of FIG. 3 or as a separate process performed by the event management system. The process may begin by receiving information for a future event from a user (step 400).

Next, the system automatically captures and filters all historically relevant data for an event (step 402). The data, values, and information may be captured before, during, or after the event. For example, the captured data may include attendance, group affiliation, food consumption, beverage consumption, employee hours, ordered products, goods, and services, and other applicable information. In one embodiment, the data may be captured as an export of data from the applicable event, hotel, or resort management software. The data may be extracted from any number of digital sources and may include historical, ambient, and industrial normative information that is subsequently utilized to provide accurate financial sales and forecasting information.

Next, the system captures additional data relevant to the future event (step 404). The additional data may include current performance of the facility/staff/event venue, predicted weather and ambient conditions, local events (e.g., calendared activities that may affect attendance, traffic, availability, etc.). The additional data may include any number of parameters or mitigating factors that may affect the event. Applicable pricing and normative experience of the event, facility, and associated clientele may also be utilized. The data capture of steps 402 and 404 may be performed recursively over a number of days, weeks, or years to ensure that all applicable information is utilized.

Next, the system generates a forecast (step 406). The generation of the forecast may be based on the historical performance and the relevant data and the additional data of steps 402 and 404. In one embodiment, the forecast may be a report or other form of communication that provides aggressive, moderate, and conservative forecasts for the service provider (e.g., event coordinator, hotel or resort operator, etc.).

The illustrative embodiments may be utilized to reduce labor and food costs. For example, the necessary personnel, products, inventor, and overall staffing may save significant amounts of money. For example, over staffing an event may result in significant cost overruns that may prevent the service provider from being profitable. Likewise, the reverse is also true. A manager who under staffs an event may be required to call in employees to work overtime significantly boosting costs. Over staffing or under staffing may also affect the client's experience resulting in an unfavorable opinion of the event manager and/or service provider.

The illustrative embodiments may also provide increased sales through better understanding of costs and business needs, increased efficiency and time management, and the ability to identify pacing gaps and market trends early. The automated forecasting tool may be utilized to provide instant data analysis to create forecast and pace reports separated by categories, such as group, catering, and outlets. The system may be utilized by managers or administrators to review applicable financials, such as reports on covers, average check, revenue by meal, and revenue per time period (e.g., day, month, etc.).

In another embodiment, the forecasting data may be obtained and produced for a mass transit system. For example, the event may represent a single day of service for the mass transit system. The forecasting system may include a secured network including a number of sensors and data collection devices that receive user input and automatically detect the location of all vehicles or transport devices of the mass transit system. The data collected may utilize the current available data and additional data to predict the foot traffic and usage of subway resources. For example, the current performance and operational condition of the subway (e.g., on-time, fully functional, disabled vehicles, etc.), the weather, geo-regional events (e.g., sporting events, theater events, protests, rallies, etc.) and other data may be analyzed to generate a forecast. The forecasting data may become more accurate as the applicable day is approached. For example, applicable weather, events and mitigating factors, such as damages, repairs, construction, or so forth may be utilized to adjust the forecast. As previously disclosed, the forecasting report may include aggressive, moderate, and conservative forecasts for the subway operator to use in planning and allocation resources. Staffing of the ancillary services, such as security personnel, operators, captains, and subway stewards may then be optimized. The system may utilize any number of algorithms to improve forecast accuracy and give relief to operators whom have guessed what the forecast should be.

In another embodiment, the forecasting system may be utilized by a retail store serving a metropolitan area. The historical information regarding sales may be tied with weather, applicable sales or promotions, and other events to predict the traffic in one or more retail centers and the applicable revenue. As a result, the forecasting data may be utilized to forecast sales for both store managers, investors, suppliers, vendors, and other interested parties.

Figure 5A:
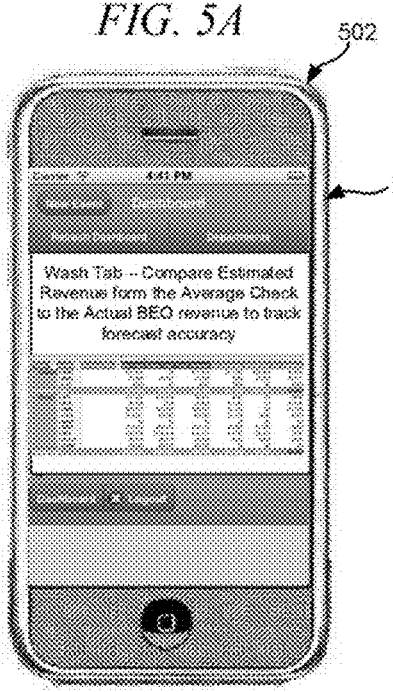
FIGS. 5A and 5B are a pictorial representation of graphical user interfaces in accordance with illustrative embodiments.
Figure 5B:
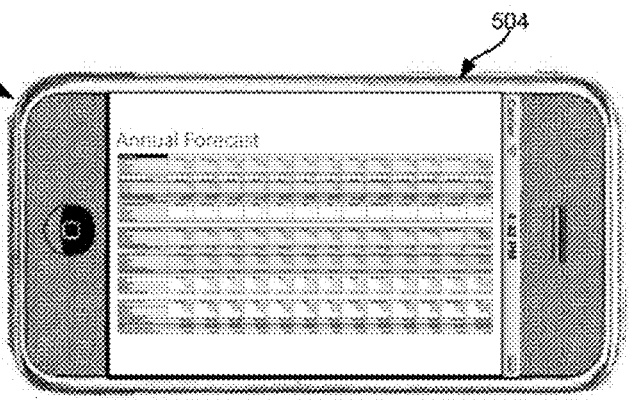
Figure 6:
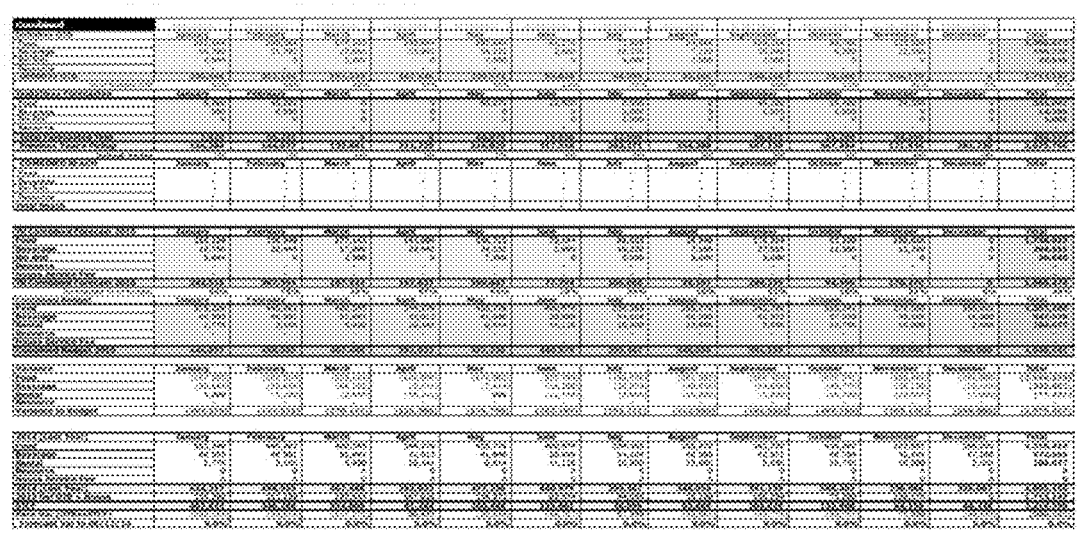
FIG. 6 is a pictorial representation of an annual forecast report of the forecasting system in accordance with an illustrative embodiment.

FIGS. 5A and 5B are a pictorial representation of graphical user interfaces 502 and 504 in accordance with an illustrative embodiment. The graphical user interfaces 502 and 504 may be displayed by a wireless device 500 representing one or more communications or computing devices. The graphical user interfaces 502 and 504 may be generated by an application being executed by the wireless device 400. In another embodiment, the graphical user interfaces 502 and 504 may represent a web browsing application accessing a particular website.

The graphical user interface 502 may illustrate a dashboard view for receiving, editing, or displaying events and other relevant information. For example, the graphical user interface 502 may be utilized to compared estimated revenue with actual revenue to track forecasting accuracy. In another example, the graphical user interface 502 may be utilized to create a new event. Similarly, any number of fields, buttons, tabs, drop-down menus, selection components and so forth may be displayed and selected from the graphical user interfaces 502 and 504. The graphical user interfaces may be utilized to receive user input including values, text, criteria, parameters, and so forth. Soft buttons of the wireless device 404 or physical buttons, dials, switches, tabs, or interfaces may also be utilized.

In one embodiment, the graphical user interfaces 502 and 504 may allow the user to utilize drop-down menus customized for the service provider, event, or facility to make selections and provide user input. In addition, additional fields or menus of the graphical user interfaces 502 and 504 may allow the user to enter custom text, numbers, data, pictures, audio files or other information. The graphical user interfaces 502 and 504 may display information, pages, or tabs for setup, annual pages, annual/monthly/90 day forecast, daily forecast, data analysis, comparisons, covers and average check and revenue by month, monthly forecast by meal period, daily forecast by meal period, revenue comparisons to previous forecasts, revenue analysis by meeting class/booking type, booking pace, lead time analysis, daily Delphi/profit and loss comparison, and other reports as are illustrated in FIGS. 6-14.

The information of the graphical user interfaces of FIGS. 5A-14 are stored privately and may only be accessible or visible to authorized users that have logged into the website (e.g. utilizing Internet Explorer, Firefox, Chrome, Safari, Opera, etc.) or another application. One or more administrators may set preferences for allowing users access to the events and other information managed and accessed through the graphical user interfaces. The events are organized by service provider to maintain privacy and security. The website and applications may store all information indefinitely or may be set to purge information after a pre-defined time period for liability purposes.

The graphical user interfaces may utilize a dashboard viewing mode. In one embodiment, the user may be able to review active events, see closed events, or creating new events as needed. In addition, the entries or events may include interactive elements, such as hyperlinks that allow the user to view additional details or information. The graphical user interfaces may also display information for events including creation time, event age, location, event code, client name if applicable, status (e.g. active, closed, in-process, etc.), departments, and action details.

The graphical user interfaces may allow a user to perform searches of events or other information. The settings may be utilized to customize information, such as username, password, alert and message information and preferences, assigned department and other applicable information. The graphical user interfaces may also be utilized to solicit feedback regarding performance and functionality of the forecasting system, website, and applications utilized for event management.

An authorized user is able to provide user input utilizing a number of drop-down menus, pre-populated fields, and custom fields before saving a new event. For example, the user may utilize the graphical user interfaces to provide custom details regarding the event. The events details provide a more in-depth description of the event being logged. The user may add any instructions, information, or details needed to this field. In one embodiment, the event details may be provided with information corresponding to the event code.

Manager, employee, and staff contacts may be pre-populated based on multiple factors including the event information (e.g., title, code, etc.). Employees may be automatically booked based on change or updates recorded for an event in the forecasting system. In addition, the associated employees may be contacted through personal or service provider provided devices. For example, a number of employees may have registered a cell phone or smart phone to receive text messages or application alerts. Additionally, automatic calls or email messages may be utilized. In one embodiment, a username may be utilized to send an alert through the application utilizing an iOS, Android, Google, or other known or utilized framework or username. In another embodiment, nicknames may be associated with communications device, such as maintenance so that the devices may be passed from person to person at the end of a shift while still receiving alerts. It may be very helpful to communicate with a department without knowing who is on shift at the time. In another embodiment, a calendaring program, clock-in system, tracking system, or other system or logic may be utilized to determine who to contact. For example, logic may specify the device or party to be contacted based on time of day, location, and event code.

Once the new event is saved a number of things may automatically occur. For example, the new event may be saved in a database with all of the associated information. The forecasting system may then determine the contact method and information that was selected and communicate utilizing automated call, email, text message, application alert, or so forth. As previously described, some of the alerts or messages may be sent utilizing $3^{rd}$ party systems or platforms. Upon successful communication of the message the event may be separately logged in a database that keeps track of event histories. The event history may be tracked and sent to designated users based on pre-defined triggers, such as time periods, resolved events, and so forth. The forecasting system may also send repeat messages or notifications to the same users or additional users in response to receiving event updates (e.g. the administrator may notify employees of booking passing threshold levels). As a result, the administrator may be able to stay informed of all events that are noted as important according to preferences stored in the settings. Based on the messages, notifications, or alerts the problem(s) associated with the event may be taken care of with the event or tasks associated with the event being closed (e.g., employee scheduling, food ordering, product and service inventories, etc.). All updates to the events are synched across multiple devices to ensure that things are not completed multiple times and in order to ensure efficiency.

With regard to FIGS. 6-14, the illustrative reports and analysis may provide an annual forecast 600, a 90-day forecast 700, covers, average check and revenue by month 800, a monthly forecast by meal period 900, a daily forecast by meal period 1000, a comparison of revenue to previous forecasts 1100, revenue analysis by meeting class/booking type 1200, booking pace 1300, and lead time analysis 1400 as well as the calculations, fields, rows, columns, logic, data, dates (e.g., month, year, etc.) and information that are shown in each of the FIGS. 6-14. Any number of reports and analysis may be provided as are described herein.

The illustrative embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a non-transitory machine-readable medium having stored thereon instructions, which may be used to program a computing system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object-oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (e.g., through the Internet using an Internet Service Provider).

Figure 15:
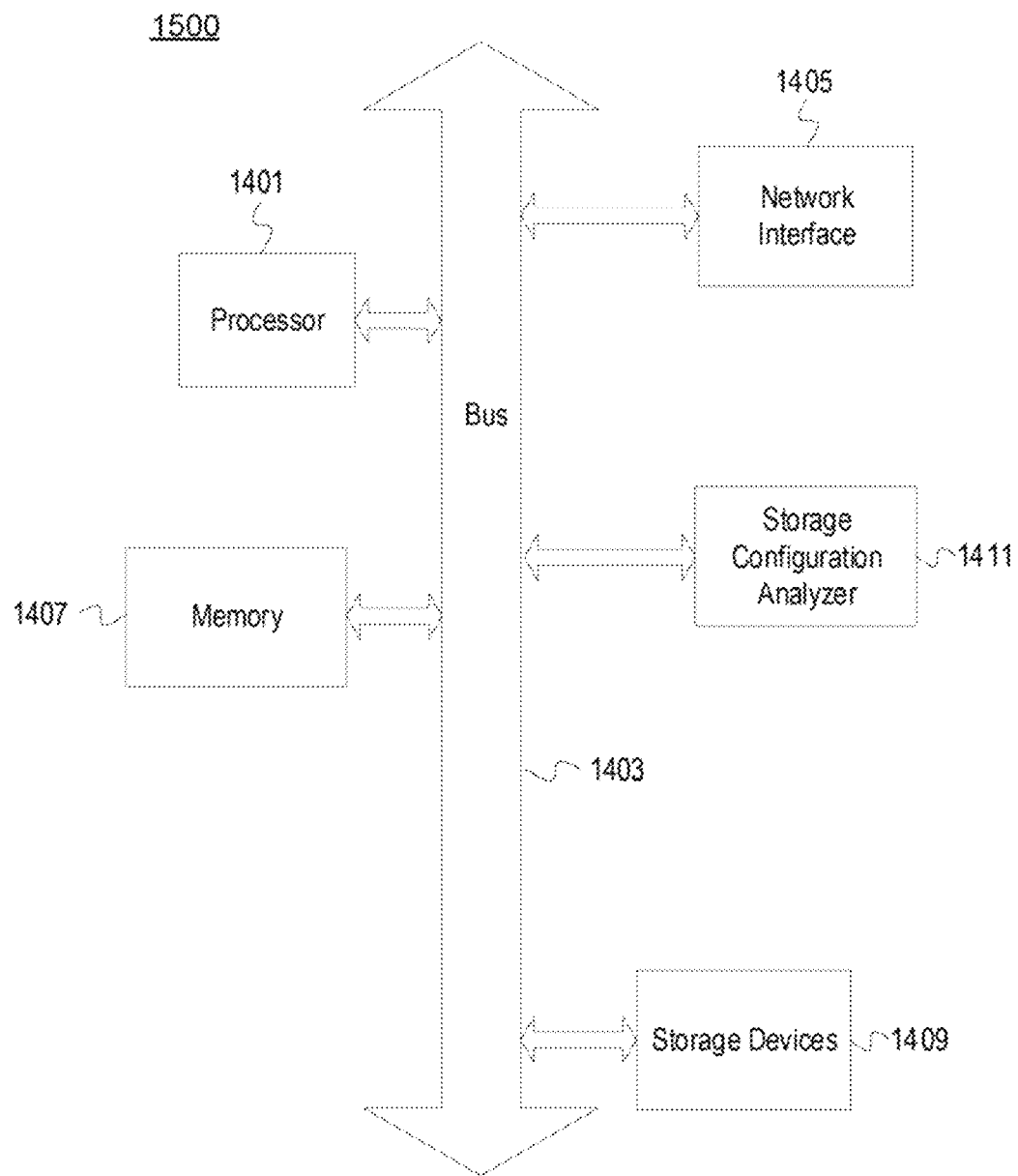
FIG. 15 depicts a computing system 1500 in accordance with an illustrative embodiment.

FIG. 15 depicts a computing system 1500 in accordance with an illustrative embodiment. For example, the computing system 1500 may represent a device, such as the wireless device 10 of FIG. 1. The computing system 1500 includes a processor unit 1401 (possibly including multiple processors, multiple cores, multiple nodes, and/or implementing multi-threading, etc.). The computing system includes memory 1407. The memory 1407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computing system also includes a bus 1403 (e.g., PCI, ISA, PCI-Express, HyperTransport®, InfiniBand®, NuBus, etc.), a network interface 1406 (e.g., an ATM interface, an Ethernet interface, a Frame Relay interface, SONET interface, wireless interface, etc.), and a storage device(s) 1409 (e.g., optical storage, magnetic storage, etc.).

The system memory 1407 embodies functionality to implement all or portions of the embodiments described above. The system memory 1407 may include one or more applications or sets of instructions for implementing an event management engine for communicating with one or more devices (e.g., smart phones, servers, tablets, etc.) directly or through networks (e.g., Wi-Fi, cellular, cloud, etc.). The event management engine may be stored in the system memory 1407 and executed by the processor unit 1402. Code may be implemented in any of the other devices of the computing system 1500. Any one of these functionalities may be partially (or entirely) implemented in hardware and/or on the processing unit 1401. For example, the functionality may be implemented with an application specific integrated circuit, in logic implemented in the processing unit 1401, in a co-processor on a peripheral device or card, etc. Further, realizations may include fewer or additional components not illustrated in FIG. 15 (e.g., video cards, audio cards, additional network interfaces, peripheral devices, etc.). The processor unit 1401, the storage device(s) 1409, and the network interface 1405 are coupled to the bus 1403. Although illustrated as being coupled to the bus 1403, the memory 1407 may be coupled to the processor unit 1401. The computing system 1500 may further include any number of optical sensors/cameras, global positioning components, accelerometers, magnetometers, microphones, gyroscopes, temperature sensors, and so forth for verifying user biometrics, event, or other environmental conditions, such as motion, proximate users, light, or other events that may be associated with the wireless earpieces or their environment.

The features, steps, and components of the illustrative embodiments may be combined in any number of ways and are not limited specifically to those described. The illustrative embodiments may represent systems, methods, devices/apparatus, computer implemented methods, computer program products, and so forth. The illustrative embodiments contemplate numerous variations in the smart devices and communications described. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of embodiments, processes or methods of the invention. It is understood that any other modifications, substitutions, and/or additions may be made, which are within the intended spirit and scope of the disclosure. For the foregoing, it can be seen that the disclosure accomplishes at least all of the intended objectives.

The previous detailed description is of a small number of embodiments for implementing the invention and is not intended to be limiting in scope. The described embodiments are applicable and expected to be combined across embodiments, figures, and description regardless of artificially determined species, invention partitions, or other processes external to this application. The following claims set forth a number of the embodiments of the invention disclosed with greater particularity.

What is claimed:

1. A method for performing forecasting for an event, the method comprising:
   receiving information associated with an event from a user including at least food, venue, and services required for the event on a server;
   automatically capturing historical data associated with the information for a past event similar to the event from a plurality of electronic resources;
   automatically capturing additional data that affects the event from a plurality of digital resources utilizing the server;
   generating a forecast for the event utilizing the server including at least projections for a plurality of physical assets and services required to manage the event utilizing the information, historical data, and the additional data;
   automatically scheduling resources for the event including the plurality of physical assets and the services in response to the forecast utilizing the server;
   automatically communicating one or more alerts to one or more devices associated with authorized users indicating 1) the forecast has been generated for the event, and 2) changes to the forecast generated in response to changes in the information or the additional data associated with the event, wherein the one or more alerts are communicated to schedule and allocate resources including the plurality of physical assets and the services of the event; and automatically rescheduling the resources for the event including the plurality of physical assets and the services in response to changes to the forecast.

2. The method of claim 1, further comprising:
filtering the historical data for the event.

3. The method of claim 1, wherein the event represents a future event, and wherein the historical data is associated with a previous event similar to the event.

4. The method of claim 1, further comprising:
automatically updating the forecast in response to updates to the information and additional data.

5. The method of claim 4, further comprising:
communicating a comparison of an updated version of the forecast with a forecast originally calculated in response to updating the forecast.

6. The method of claim 1, wherein the physical assets and services include at least venue, equipment, and technology services.

7. The method of claim 1, further comprising:
automatically calculating forecast figures based on the historical data; and
analyzing data associated with the forecast figures to adjust the forecast figures existing.

8. The method of claim 1, further comprising:
evaluating anticipated risk, reach, and revenue performance associated with the event as part of the forecast.

9. A system for managing events, the system comprising:
a server configured to interface with a website or applications installed on a plurality of electronic devices, the server is configured to receive information associated with an event from a user including at least venue, food, and services required for the event, automatically capture historical data associated with the information for the event in the past, and automatically capture data associated with the event from a plurality of digital resources, automatically generate a forecast for the event including at least projections for a plurality of physical assets and services required to manage the event for authorized users, schedule resources including the plurality of physical assets and the services in response to the forecast, automatically communicate one or more alerts to one or more devices associated with the authorized users indicating 1) the forecast has been generated, and 2) changes to the forecast generated in response to changes in the information or additional data associated with the event, wherein the one or more alerts are communicated to schedule and allocate the resources including the plurality of physical assets and the services of the event, and automatically reschedule the resources for the event including the plurality of physical assets and the services in response to changes to the forecast; and at least one database in communication with the server, the database is configured to store the information, the historical data, and the data associated with the event for access by the server.

10. The system of claim 9, wherein the server filters the historical data for the event.

11. The system of claim 9, wherein the physical assets and services include at least venue, equipment or materials, and technology services, and wherein the event represents a future event, and wherein the historical data is associated with one or more previous events similar to the event.

12. The system of claim 9, wherein the server automatically updates the forecast in response to updates to the information and additional data.

13. The system of claim 9, wherein the server communicates a comparison of an updated version of the forecast with a forecast originally calculated in response to updating the forecast.

14. The system of claim 9, wherein the server evaluates anticipated risk, reach, and revenue performance associated with the event as part of the forecast.

15. A server for performing forecasting for events comprising:
a processor for executing a set of instructions; and
a memory for storing the set of instructions, wherein the set of instructions are configured to:
receive information associated with an event from a user including at least food, venue, and services required for the event;
automatically capture historical data associated with the information for a past event similar to the event;
automatically capture additional data that affects the event from a plurality of digital resources;
generate a forecast for the event including at least projections for a plurality of physical assets and services required to manage the event utilizing the information, the historical data, and the additional data;
automatically schedule resources including the plurality of physical assets and the services in response to the forecast;
communicate one or more alerts to one or more devices associated with the user indicating 1) the forecast has been generated, and 2) changes to the forecast generated in response to changes in the information or additional data associated with the event, wherein the one or more alerts are communicated to allocate resources including the plurality of physical assets and the services of the event; and
automatically reschedule the resources for the event including the plurality of physical assets and the services in response to changes to the forecast.

16. The server of claim 15, wherein the set of instructions filters the historical data for the event.

17. The server of claim 15, wherein the set of instructions automatically updates the forecast in response to updates to the information and additional data.

18. The server of claim 17, wherein the set of instructions communicate a comparison of an updated version of the forecast with a forecast originally calculated in response to updating the forecast.

19. The server of claim 15, wherein the physical assets and services include at least venue, equipment, and technology services.

20. The server of claim 15, wherein the set of instructions evaluate anticipated risk, reach, and revenue performance associated with the event as part of the forecast.

* * * * *